United States Patent
Lu

(10) Patent No.: US 11,510,257 B2
(45) Date of Patent: Nov. 22, 2022

(54) COMMUNICATIONS METHOD AND APPARATUS

(71) Applicant: Huawei Technologies Co., Ltd., Shenzhen (CN)

(72) Inventor: Wei Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/109,605

(22) Filed: Dec. 2, 2020

(65) Prior Publication Data

US 2021/0092782 A1    Mar. 25, 2021

Related U.S. Application Data

(63) Continuation of application No. PCT/CN2019/090760, filed on Jun. 11, 2019.

(30) Foreign Application Priority Data

Jun. 11, 2018  (CN) .......................... 201810597786.8

(51) Int. Cl.
*H04W 76/19* (2018.01)
*H04W 76/12* (2018.01)
(Continued)

(52) U.S. Cl.
CPC ............ *H04W 76/12* (2018.02); *H04W 76/11* (2018.02); *H04W 76/19* (2018.02); *H04W 80/10* (2013.01)

(58) Field of Classification Search
CPC ..... H04W 76/12; H04W 76/11; H04W 76/19; H04W 80/10; H04W 76/32; H04W 88/14;
(Continued)

(56) References Cited

U.S. PATENT DOCUMENTS

2019/0215724 A1*  7/2019  Talebi Fard .......... H04L 43/028
2019/0274185 A1*  9/2019  Stojanovski .......... H04W 80/10
(Continued)

FOREIGN PATENT DOCUMENTS

CN    106470439 A    3/2017
CN    107592328 A    1/2018
(Continued)

OTHER PUBLICATIONS

"3rd Generation Partnership Project; Technical Specification Group Services and System Aspects; System Architecture for the 5G System; Stage 2 (Release 15)," 3GPP TS 23.501 V15.1.0, Mar. 2018, 201 pages.

*Primary Examiner* — Lakeram Jangbahadur
(74) *Attorney, Agent, or Firm* — Slater Matsil, LLP

(57) ABSTRACT

A communications method and apparatus, the method including receiving, by a policy control network element, from a first session management network element, a policy request message, sending, by the policy control network element, to the first session management network element, according to the policy request message, policy information, where the policy information comprises a data network access identifier (DNAI), and establishing, by the first session management network element, according to the DNAI, a first user plane network element for a first protocol data unit (PDU) session for a terminal device.

17 Claims, 6 Drawing Sheets

(51) Int. Cl.
*H04W 76/11* (2018.01)
*H04W 80/10* (2009.01)

(58) Field of Classification Search
CPC ... H04W 92/24; H04L 12/1407; H04M 15/66; H04M 15/70; H04M 15/725; H04M 15/74; H04M 15/8228
See application file for complete search history.

(56) References Cited

U.S. PATENT DOCUMENTS

2019/0306251 A1\* 10/2019 Talebi Fard .......... H04W 76/10
2019/0313468 A1\* 10/2019 Talebi Fard ........ H04W 40/246

FOREIGN PATENT DOCUMENTS

| CN | 107888498 A | 4/2018 | |
|---|---|---|---|
| CN | 107920372 A | 4/2018 | |
| CN | 108011899 A | 5/2018 | |
| EP | 3755012 A1 | 12/2020 | |
| WO | 2017025629 A1 | 2/2017 | |
| WO | 2018026169 A1 | 2/2018 | |
| WO | 2019101104 A1 | 5/2019 | |
| WO | WO-2019212543 A1 \* | 11/2019 | .......... H04W 68/005 |

\* cited by examiner

COMMUNICATIONS METHOD AND APPARATUS

CROSS-REFERENCE TO RELATED APPLICATIONS

This application is a continuation of International Application No. PCT/CN2019/090760, filed on Jun. 11, 2019, which claims priority to Chinese Patent Application No. 201810597786.8, filed on Jun. 11, 2018. The disclosures of the aforementioned applications are hereby incorporated by reference in their entireties.

TECHNICAL FIELD

This application relates to the field of communications technologies, and in particular, to a communications method and apparatus.

BACKGROUND

In a next-generation wireless communications system, for example, in a new radio (NR) system, a terminal device establishes a protocol data unit (PDU) session by using a user plane function (UPF) network element, and transmits data of the terminal device by using the PDU session.

In a PDU session establishment process, a session management function (SMF) network element may determine the UPF network element based on policy rule information sent from a policy control function (PCF) network element or location information of the terminal device. The UPF network element may be configured to be responsible for functions such as routing and forwarding of a data packet in the PDU session.

However, in the prior art, when a mode of the PDU session is a session and service continuity (SSC) mode 2, service continuity of the terminal device cannot be ensured in a PDU session re-establishment process.

SUMMARY

Embodiments of this application provide a communications method and apparatus, to resolve a problem that service continuity cannot be ensured in a PDU session re-establishment process.

According to a first aspect, an embodiment of this application provides a communications method, and the method includes the following.

A policy control network element receives a policy request message from a first session management network element. The policy request message is used to request policy information. The policy control network element sends the policy information to the first session management network element. The policy information includes a data network access identifier (DNAI). The DNAI is configured to determine a first user plane network element. The first user plane network element is configured to establish a first protocol data unit (PDU) session for the terminal device.

In the foregoing method, the policy control network element sends the DNAI to the first session management network element, so that the first session management network element can directly determine the first user plane network element based on the received DNAI. In this way, in a first PDU session establishment process, the DNAI sent from the policy control network element is always used, so that the DNAI can remain unchanged. Once selected, the DNAI remains unchanged, so that an application server that provides a data service for the terminal device may request to transmit an application data flow by using the DNAI as a data access point, thereby improving service continuity between the application server and the terminal device.

In a possible implementation, the method further includes the policy control network element receives the DNAI from a second session management network element, where the second session management network element establishes a second PDU session for the terminal device.

In the foregoing method, the DNAI determined in a process of establishing the second PDU session by the second session management network element is used to reduce DNAI determining complexity and improve efficiency.

In a possible implementation, the method further includes the following.

The policy control network element obtains at least one DNAI and selects the DNAI from the at least one DNAI.

In the foregoing method, the policy control network element can autonomously select the DNAI from the at least one DNAI to expand a selection range of the DNAI and improve flexibility of the DNAI selection.

In a possible implementation, the method further includes the following.

The policy control network element obtains at least one DNAI, and sends the at least one DNAI to a second session management network element. The second session management network element establishes a second PDU session for the terminal device. The policy control network element receives the DNAI that the second session management network element selects from the at least one DNAI.

In the foregoing method, the second session management network element can select the DNAI from the at least one DNAI to expand a selection range of the DNAI and improve flexibility of the DNAI selection.

In a possible implementation, before the policy control network element receives the policy request message from the first session management network element, the method further includes the following.

The policy control network element receives a first message from the application server. The first message includes application relocation impossible indication information. The application relocation impossible indication information is used to indicate a DNAI of a PDU session established for the terminal device to remain unchanged.

The policy control network element determines, based on the first message, that a mode of a PDU session to which the first message belongs is an SSC mode 2, and sends a first response to the application server. The first response includes at least one of an SSC mode 2 identifier and rejection indication information. The rejection indication information is used to reject a request indicated by using the application relocation impossible indication information sent from the application server.

In the foregoing method, the first response message is used to enable the application server to determine that the DNAI of the PDU session established for the terminal device may not remain unchanged, so that the application server can take a corresponding measure to reduce impact caused by a DNAI change.

According to a second aspect, an embodiment of this application provides a communications apparatus. The communications apparatus includes a memory, a transceiver, and a processor. The memory is configured to store an instruction. The processor is configured to execute the instruction stored in the memory, and control the transceiver to send and receive signals. When the processor executes the instruction stored in the memory, the communications apparatus is configured to perform the method according to the first aspect or any possible design of the first aspect.

According to a third aspect, an embodiment of this application provides a communications apparatus, configured to implement the first aspect or any method in the first aspect. The communications apparatus includes corresponding function modules, for example, a processing unit, a sending unit, and a receiving unit. The function modules are respectively configured to implement the method according to the first aspect or any possible design of the first aspect.

According to a fourth aspect, an embodiment of this application provides a communications method, including the following.

A first session management network element receives policy information from a policy control network element. If the policy information includes a data network access identifier (DNAI), the first session management network element determines a first user plane network element based on the DNAI, and establishes a first protocol data unit (PDU) session for a terminal device by using the first user plane network element.

In the foregoing method, in a process of establishing the first PDU session for the terminal device, the policy control network element sends the DNAI to the first session management network element, so that the first session management network element can directly determine the first user plane network element based on the received DNAI. In this way, in a first PDU session establishment process, the DNAI sent from the policy control network element is always used, so that the DNAI can remain unchanged, thereby improving service continuity between an application server and the terminal device.

In a possible implementation, the method further includes the following.

If the policy information does not include the DNAI, the first session management network element determines the first user plane network element for the terminal device, and sends, to the policy control network element, a DNAI corresponding to the first user plane network element.

In the foregoing method, the first session management network element sends the determined DNAI to the policy control network element, so that the policy control network element can store the DNAI. In a PDU session re-establishment process, the DNAI stored in the policy control network element may be always used, so that the DNAI can remain unchanged.

In a possible implementation, the DNAI is determined in a process of establishing a second PDU session for the terminal device.

In the foregoing method, the DNAI determined in the process of establishing the second PDU session by a second session management network element may be used to reduce DNAI determining complexity and improve efficiency.

In a possible implementation, the DNAI is selected by the policy control network element from at least one DNAI.

In the foregoing method, the policy control network element can autonomously select the DNAI to expand a selection range of the DNAI and improve flexibility of the DNAI selection.

In a possible implementation, the DNAI is selected from at least one DNAI and sent to the policy control network element by a second session management network element, and the second session management network element establishes a second PDU session for the terminal device.

In the foregoing method, the second session management network element can autonomously select the DNAI to expand a selection range of the DNAI and improve flexibility of the DNAI selection.

In a possible implementation, the method further includes the following.

After the first session management network element releases the first PDU session, the first session management network element sends a notification message to the application server. The notification message includes at least one of a release cause and the DNAI.

In the foregoing method, the notification message is used to enable the application server to determine that the first PDU session is released, so that the application server can determine that the DNAI may change due to the release of the PDU session, and take a corresponding measure to reduce impact caused by the DNAI change.

According to a fifth aspect, an embodiment of this application provides a communications apparatus. The communications apparatus includes a memory, a transceiver, and a processor. The memory is configured to store an instruction. The processor is configured to execute the instruction stored in the memory, and control the transceiver to send and receive signals. When the processor executes the instruction stored in the memory, the communications apparatus is configured to perform the method according to the fourth aspect or any possible design of the fourth aspect.

According to a sixth aspect, an embodiment of this application provides a communications apparatus, configured to implement the fourth aspect or any method in the fourth aspect. The communications apparatus includes corresponding function modules, for example, a processing unit and a transceiver unit. The function modules are respectively configured to implement the method according to the fourth aspect or any possible design of the fourth aspect.

According to a seventh aspect, an embodiment of this application provides a communications method, including the following.

A first session management network element receives a request message from an access and mobility management network element. The request message is used to establish the protocol data unit (PDU) session for the terminal device. The first session management network element determines a first user plane network element based on the request message. The first session management network element determines a DNAI corresponding to the first user plane network element. The first session management network element sends the DNAI to a policy control network element. The first user plane network element is configured to establish the PDU session for the terminal device.

In the foregoing method, the first session management network element sends, in a process of establishing the PDU session for the terminal device, the determined DNAI to the policy control network element, so that the policy control network element can store the DNAI. In a PDU session re-establishment process, the DNAI stored in the policy control network element may be always used, so that the DNAI can remain unchanged.

In a possible implementation, the method further includes the following.

After the first session management network element releases the PDU session, the first session management network element sends a notification message to an application server. The notification message includes at least one of a release cause and the DNAI.

According to an eighth aspect, an embodiment of this application provides a communications apparatus. The communications apparatus includes a memory, a transceiver, and a processor. The memory is configured to store an instruction. The processor is configured to execute the instruction stored in the memory, and control the transceiver to send and receive signals. When the processor executes the instruction stored in the memory, the communications apparatus is configured to perform the method according to the seventh aspect or any possible design of the seventh aspect.

According to a ninth aspect, an embodiment of this application provides a communications apparatus, configured to implement the seventh aspect or any method in the seventh aspect. The communications apparatus includes corresponding function modules, for example, a processing unit and a transceiver unit. The function modules are respectively configured to implement the method according to the seventh aspect or any possible design of the seventh aspect.

According to a tenth aspect, an embodiment of this application provides a communications method, including the following.

A policy control network element receives a DNAI sent from the first session management network element. The DNAI is determined by the first session management network element based on a first user plane network element. The first user plane network element is configured to establish a protocol data unit (PDU) session for the terminal device. The policy control network element stores the DNAI.

In a possible implementation, before the policy control network element receives a policy request message from the first session management network element, the method further includes the following.

The policy control network element receives a first message from an application server. The first message includes application relocation impossible indication information. The application relocation impossible indication information is used to indicate a DNAI of a PDU session established for the terminal device to remain unchanged.

The policy control network element determines, based on the first message, that a mode of a PDU session to which the first message belongs is an SSC mode 2, and sends a first response to the application server. The first response includes at least one of an SSC mode 2 identifier and rejection indication information. The rejection indication information is used to reject a request indicated by using the application relocation impossible indication information sent from the application server.

According to an eleventh aspect, an embodiment of this application provides a communications apparatus. The communications apparatus includes a memory, a transceiver, and a processor. The memory is configured to store an instruction. The processor is configured to execute the instruction stored in the memory, and control the transceiver to send and receive signals. When the processor executes the instruction stored in the memory, the communications apparatus is configured to perform the method according to the tenth aspect or any possible design of the tenth aspect.

According to a twelfth aspect, an embodiment of this application provides a communications apparatus, configured to implement the tenth aspect or any method in the tenth aspect. The communications apparatus includes corresponding function modules, for example, a processing unit and a transceiver unit. The function modules are respectively configured to implement the method according to the tenth aspect or any possible design of the tenth aspect.

An embodiment of this application provides a communications apparatus, configured to perform the communications method in any one of the foregoing possible designs.

An embodiment of this application provides a communications apparatus including at least one processor, where the at least one processor is coupled to at least one memory.

The at least one processor is configured to execute a computer program or an instruction stored in the at least one memory, so that the apparatus performs the communications method in any one of the foregoing possible designs.

An embodiment of this application provides a readable storage medium. The readable storage medium stores a program or an instruction. When the program or the instruction is executed, the communications method in any one of the foregoing possible designs is performed.

An embodiment of this application provides a computer program product. When a computer reads and executes the computer program product, the computer is enabled to perform the communications method in any one of the foregoing possible designs.

An embodiment of this application provides a chip. The chip is connected to a memory, and is configured to read and execute a software program stored in the memory, to implement the communications method in any one of the foregoing possible designs.

DETAILED DESCRIPTION OF ILLUSTRATIVE EMBODIMENTS

The following describes embodiments of this application in detail with reference to accompanying drawings of this specification.

The embodiments of this application may be applied to various mobile communications systems, for example, a new radio (NR) system, a long term evolution (LTE) system, a long term evolution-advanced (LTE-A) system, a future communications system, and other communications systems. Specifically, this is not limited herein.

Figure 1:
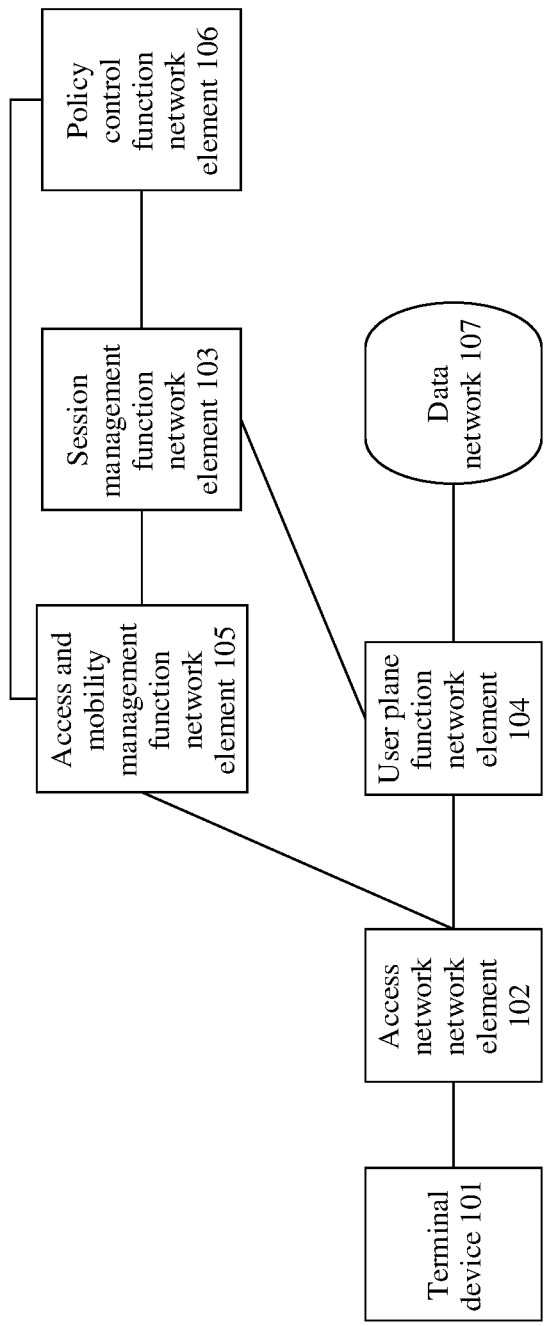
FIG. 1 is a schematic diagram of a system architecture applicable to an embodiment of this application.

First, for ease of understanding of the embodiments of this application, a communications system shown in FIG. 1 is used as an example to describe in detail a communications system applicable to the embodiments of this application.

The following further describes in detail this application with reference to the accompanying drawings.

FIG. 1 is an example of a schematic diagram of a system architecture applicable to an embodiment of this application. As shown in FIG. 1, in a 5G system architecture, a terminal device 101 may communicate with a core network by using an access network network element 102. The terminal device 101 may be a device that has a wireless transceiver function or a chip that can be disposed in the device, or may be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal in the embodiments of this application may be a mobile phone, a tablet (Pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal for transportation safety, a wireless terminal in a smart city, a wireless terminal in a smart home, or the like.

The access network (AN) network element 102 may also be referred to as a radio access network (RAN) network element, and is collectively referred to as a RAN network element below. The RAN network element is mainly responsible for providing a wireless connection for the terminal device 101, ensuring reliable transmission of uplink and downlink data of the terminal device 101 and the like. The access network network element 102 may be a gNB (generation NodeB) in a 5G system, may be a base transceiver station (BTS) in a global system for mobile communication (GSM) system or a code division multiple access (CDMA) system, may be a NodeB (NB) in a wideband code division multiple access (WCDMA) system, or may be an evolved NodeB (eNB) in an LTE system, or the like.

A session management function (SMF) network element 103 is mainly responsible for establishing a session, managing a session, and the like for the terminal device 101.

A user plane function (UPF) network element 104 is a function network element in a user plane of the terminal device 101, and main functions include data packet routing and forwarding, downlink data packet buffering, quality of service (QoS) processing of user plane data, and the like.

Main functions of an access and mobility management function (AMF) network element 105 include a termination point of a wireless access network control plane, a termination point of non-access signaling, mobility management, access authorization or authentication, and the like.

A policy control function (PCF) network element 106 is mainly responsible for functions such as establishment, release, and modification of a user plane transmission path.

A data network (DN) 107 may be a network that provides a service for the terminal device 101.

It should be understood that FIG. 1 is merely an example. The system shown in FIG. 1 may further include another network element, for example, an authentication server function (AUSF) network element, a network exposure function (NEF) network element, and a unified data management (UDM) network element, which are not shown one by one herein.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of new service scenarios, the technical solutions provided in the embodiments of this application are also applicable to similar technical problems.

Figure 2:
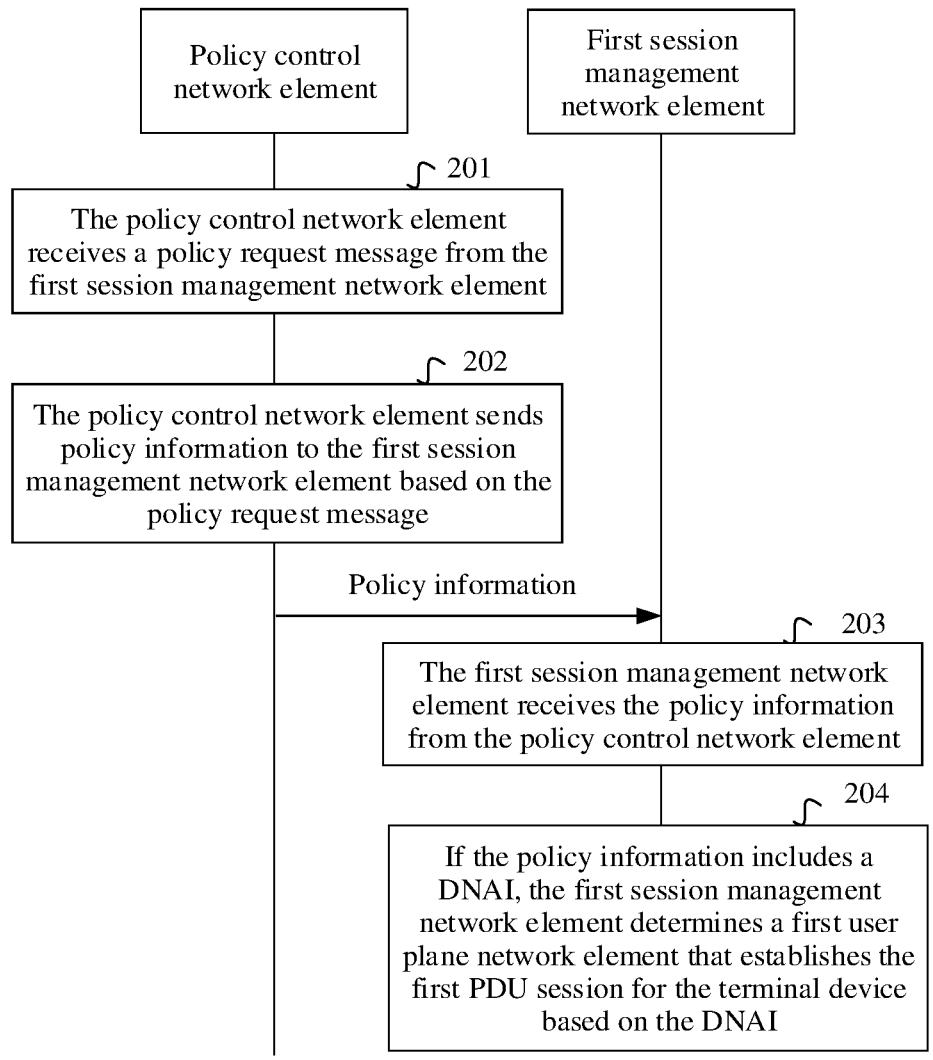
FIG. 2 is a schematic flowchart of a communications method according to an embodiment of this application.

With reference to the foregoing descriptions, FIG. 2 is a schematic flowchart of a communications method according to an embodiment of this application. In the procedure shown in FIG. 2, a policy control network element may be a PCF network element, a session management network element may be an SMF network element, a user plane network element may be a UPF network element, and an access and mobility management network element may be an AMF network element.

Referring to FIG. 2, the method includes the following steps.

Step 201: The policy control network element receives a policy request message from a first session management network element.

The policy request message is used to request policy information.

Before step 201, a terminal device initiates a process of establishing a first PDU session to the first session management network element. For details, refer to descriptions in an existing standard, and the details are not described herein.

Step 202: The policy control network element sends the policy information to the first session management network element based on the policy request message.

The policy information includes a data network access identifier (DNAI), and the DNAI is used to determine a first user plane network element for establishing the first PDU session for the terminal device.

The DNAI is a DNAI associated with an application server, and the application server is configured to provide a data service for the terminal device by using the first PDU session.

It should be noted that the policy information may alternatively be other information that includes the DNAI. A name of the policy information is not limited in the embodiments of this application.

Step 203: The first session management network element receives the policy information from the policy control network element.

Step 204: If the policy information includes the data network access identifier (DNAI), the first session management network element determines, based on the DNAI, the first user plane network element for establishing the first PDU session for the terminal device.

In the foregoing procedure, in the process of establishing the first PDU session for the terminal device, the policy control network element sends the DNAI associated with the application server to the first session management network element, so that the first session management network element can directly determine the first user plane network element based on the DNAI, thereby ensuring that, in the process of establishing the first PDU session, the DNAI associated with an application server remains unchanged. Once selected, the DNAI remains unchanged, so that the application server that provides the data service for the terminal device may request to transmit an application data flow by using the DNAI as a data access point, thereby improving service continuity between the application server and the terminal device.

It should be noted that, before step 204, the first session management network element may further receive a context setup request from the access and mobility management network element. The context setup request includes information such as location information of the terminal device or a data network name (DNN). The DNN is a name of a DN that the terminal device needs to access.

In step 204, the policy information may alternatively not include the DNAI. In a scenario in which the policy information does not include the DNAI, the first session management network element may determine the first user plane network element in another manner. For example, the first session management network element may determine the first user plane network element based on information such as the location information of the terminal device or the DNN.

When the policy information may alternatively not include the DNAI, after determining the first user plane network element, the first session management network element may send a DNAI corresponding to the first user plane network element to the policy control network element. After receiving the DNAI sent from the first session management network element, the policy control network element may associate the received DNAI with the application server. After the first PDU session is released, when a PDU session is re-established for the terminal device, the policy control network element sends, to a corresponding session management network element, the DNAI sent from the first session management network element, so that the session management network element determines a user plane network element based on the DNAI, to make a DNAI of a PDU session established for the terminal device remain unchanged.

In the embodiments of this application, there is a plurality of methods for determining the DNAI in the policy information. Details are described below.

In a first possible implementation, the DNAI is determined in a process of establishing a second PDU session for the terminal device. In the process of establishing the second PDU session for the terminal device, the second session management network element sends, to the policy control network element, a DNAI corresponding to a determined second user plane network element. The policy control network element stores the DNAI corresponding to the second user plane network element, and sends the DNAI to the first session management network element in step 202. The second PDU session is established before the first PDU session is established and is released before the first PDU session is established.

A PDU session established for the terminal device may be released due to various reasons. For example, when the terminal device moves to a service area of another UPF network element, a current UPF network element cannot continue to route and forward data between the terminal device and the application server. In this case, a current PDU session needs to be released, and a PDU session needs to be re-established.

In this embodiment of this application, after the first session management network element releases the first PDU session, the first session management network element may send a notification message to the application server, and the notification message includes at least one of a release cause and the DNAI.

It should be noted that the first session management network element may directly send the notification message to the application server. Alternatively, the notification message may be sent to the policy control network element or a network capability exposure network element by the first session management network element, and then be forwarded to the application server by the policy control network element or the network capability exposure network element.

It should be noted that the message sent from the first session management network element to the policy control network element or the capability exposure network element may be different from the message sent from the policy control network element or the capability exposure network element to the application server. At least one of the information release cause and the DNAI in the message sent from the first session management network element to the policy control network element or the capability exposure network element may be the same or different from that in the message sent from the policy control network element or the capability exposure network element to the application server.

Optionally, after receiving the notification message, the application server may send a preset DNAI to the policy control network element, and indicate the policy control network element to determine a user plane network element based on the preset DNAI when a PDU session is established for the terminal device. The preset DNAI may be the same as or different from the DNAI in the notification message. The preset DNAI may be a DNAI specified by the application server. A specific specifying manner is not limited in this embodiment of this application.

In this embodiments of this application, the second session management network element may determine, by using the following specific steps, the DNAI in the process of establishing the second PDU session for the terminal device.

Step 1: A terminal device sends a PDU session establishment request to the access and mobility management network element by using an access network network element.

The PDU session establishment request is used to request to establish a PDU session for the terminal device, and the PDU session establishment request may include information such as a PDU session identifier of the second PDU session and the data network name (DNN).

Step 2: The access and mobility management network element sends a context setup request message to the second session management network element.

The context setup request message is used to request to establish a PDU session context for the PDU session, and the context setup request message includes information such as the location information of the terminal device, the PDU session identifier of the second PDU session, and the DNN.

Step 3: The second session management network element determines the second user plane network element based on information such as the location information of the terminal device or the DNN.

For example, the second session management network element determines a user plane network element as the second user plane network element. A coverage area of the user plane network element includes a location indicated by using the location information of the terminal device.

For another example, the second session management network element determines a user plane network element that is used as an entry point of a DN indicated by the DNN as the second user plane network element.

Step 4: The second session management network element determines the DNAI corresponding to the second user plane network element, and sends the DNAI to the policy control network element.

Step 5: The policy control network element stores the DNAI.

After step 5, the second session management network element establishes the second PDU session. For a specific procedure of establishing the second PDU session, refer to descriptions in the prior art. Examples are not described one by one herein.

When the second PDU session is released and the terminal device initiates establishment of the first PDU session, the policy control network element may send the stored DNAI to the first session management network element, and the first session management network element determines the first user plane network element based on the DNAI sent from the policy control network element. In this way, a DNAI of a PDU session established for the terminal device remains unchanged.

Figure 3:
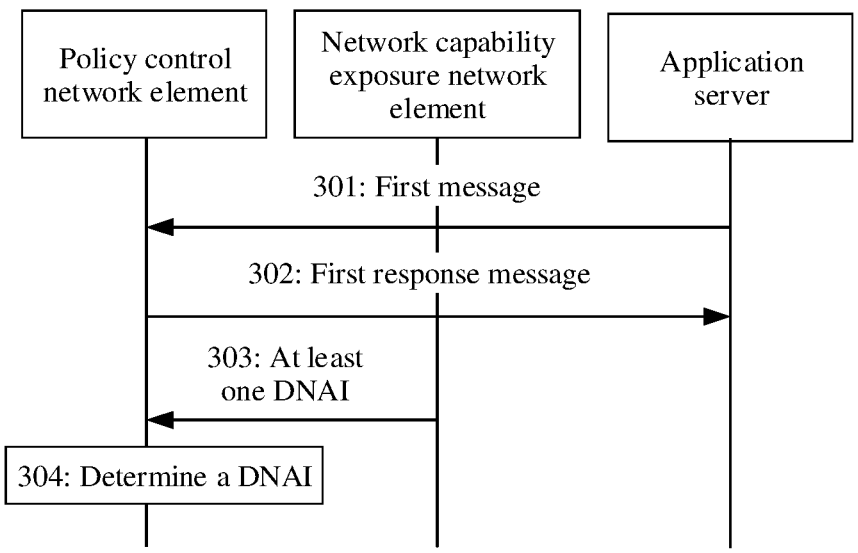
FIG. 3 is a schematic flowchart of DNAI determining according to an embodiment of this application.

In a second possible implementation, the DNAI in the policy information is selected by the policy control network element from at least one DNAI. FIG. 3 is a schematic flowchart of a DNAI determining method according to an embodiment of this application. The procedure includes the following steps.

Step 301: The application server sends a first message to a policy control server by using a network capability exposure network element, where the first message includes location information of the application server.

The first message may be a policy create or update request message.

In a possible implementation, the first message may further include application relocation impossible indication information, and the application relocation impossible indication information is used to indicate the DNAI of the PDU session established for the terminal device to remain unchanged. It should be noted that a specific representation form of the application relocation impossible indication information is not limited in this embodiment of this application, and examples are not described one by one herein.

Step 302: The policy control network element sends a first response message to the application server by using the network capability exposure network element.

When the first message is a policy create or update request message, the first response message is a policy create or update response message. Specific content of the policy create or update response message is not limited in this embodiment of this application. For details, refer to descriptions in the prior art, and the details are not described herein.

Further, when the policy control network element determines that a mode of a PDU session corresponding to the application server is an SSC mode 2, the first response message further includes at least one of an SSC mode 2 identifier and rejection indication information. The rejection indication information is used to reject a request that is indicated by using information that is for indicating the DNAI to remain unchanged and that is sent from the application server.

The policy control network element may determine, based on a data flow identity of the first message, the mode of the PDU session corresponding to the application server. A specific form of the rejection indication information is not limited in this embodiment of this application. The rejection indication information may be a pre-agreed bit sequence, or may be a reason for rejecting the DNAI to remain unchanged, or the like. Examples are not described one by one herein.

When the first response message includes only the SSC mode 2 identifier, the policy control network element implicitly indicates, to the application server, that the DNAI of the PDU session established for the terminal device cannot remain unchanged. Correspondingly, when the first response message includes the rejection indication information, the policy control network element explicitly indicates, to the application server, that the DNAI of the PDU session established for the terminal device cannot remain unchanged.

In the foregoing method, the rejection indication information is sent, so that the application server can determine that a requirement for making the DNAI remain unchanged may not be met, thereby avoiding a case in which a reason for a DNAI change cannot be determined in time when the DNAI changes.

Step 303: The network capability exposure network element determines at least one DNAI mapped to the location information of the application server, and sends the at least one DNAI to the policy control network element.

The location information of the application server may be obtained by the network capability exposure network element from the first message.

Step 304: The policy control network element stores the at least one DNAI, and selects a DNAI from the at least one DNAI.

The policy control network element may randomly select a DNAI from the at least one DNAI, or may select a DNAI from the at least one DNAI according to a preset policy. This is not limited in this embodiment of this application.

The policy control network element may mark the selected DNAI or perform an operation such as establishing an association relationship between the selected DNAI and the application server, to ensure that the DNAI of the PDU session established for the terminal device remains unchanged.

Figure 4:
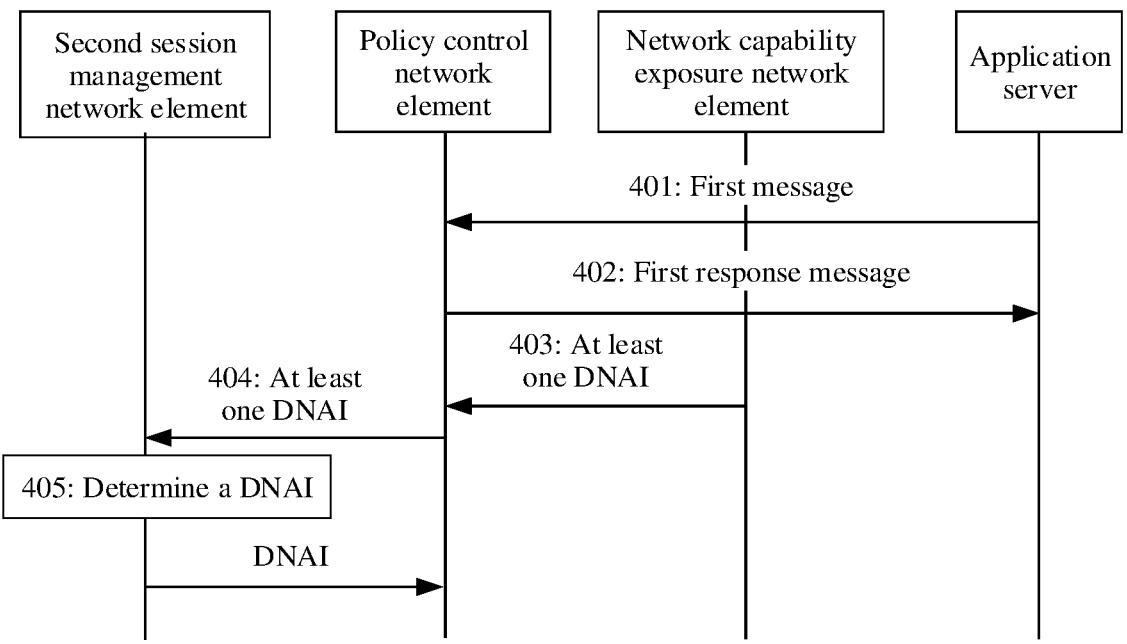
FIG. 4 is a schematic flowchart of DNAI determining according to an embodiment of this application.

In a third possible implementation, the policy control network element may further send the at least one DNAI to a second session management network element, and the second session management network element selects a DNAI. For details, refer to FIG. 4.

Step 401: The application server sends a first message to a policy control server by using a network capability exposure network element, where the first message includes location information of the application server.

The first message may further include other content. For details, refer to the description in step 301, and the details are not described herein again.

Step 402: The policy control network element sends a first response message to the application server by using the network capability exposure network element.

The first response message may further include other content. For details, refer to the description in step 302, and the details are not described herein again.

Step 403: The network capability exposure network element determines at least one DNAI mapped to the location information of the application server, and sends the at least one DNAI to the policy control network element.

Step 404: The policy control network element stores the at least one DNAI, and sends the at least one DNAI to a second session management network element.

Step 405: The second session management network element selects a DNAI from the at least one DNAI, and sends the selected DNAI to the policy control network element.

The second session management network element may randomly select a DNAI from the at least one DNAI, or may select a DNAI from the at least one DNAI according to a preset policy. This is not limited in this embodiment of this application.

The policy control network element may mark the selected DNAI or perform an operation such as establishing an association relationship between the selected DNAI and the application server, and send, when a PDU session is to be established next time, the selected DNAI to a session management network element that establishes the PDU session, to ensure that the DNAI remains unchanged.

The following describes the foregoing process in detail with reference to establishing the first PDU session and releasing the first PDU session.

Figure 5:
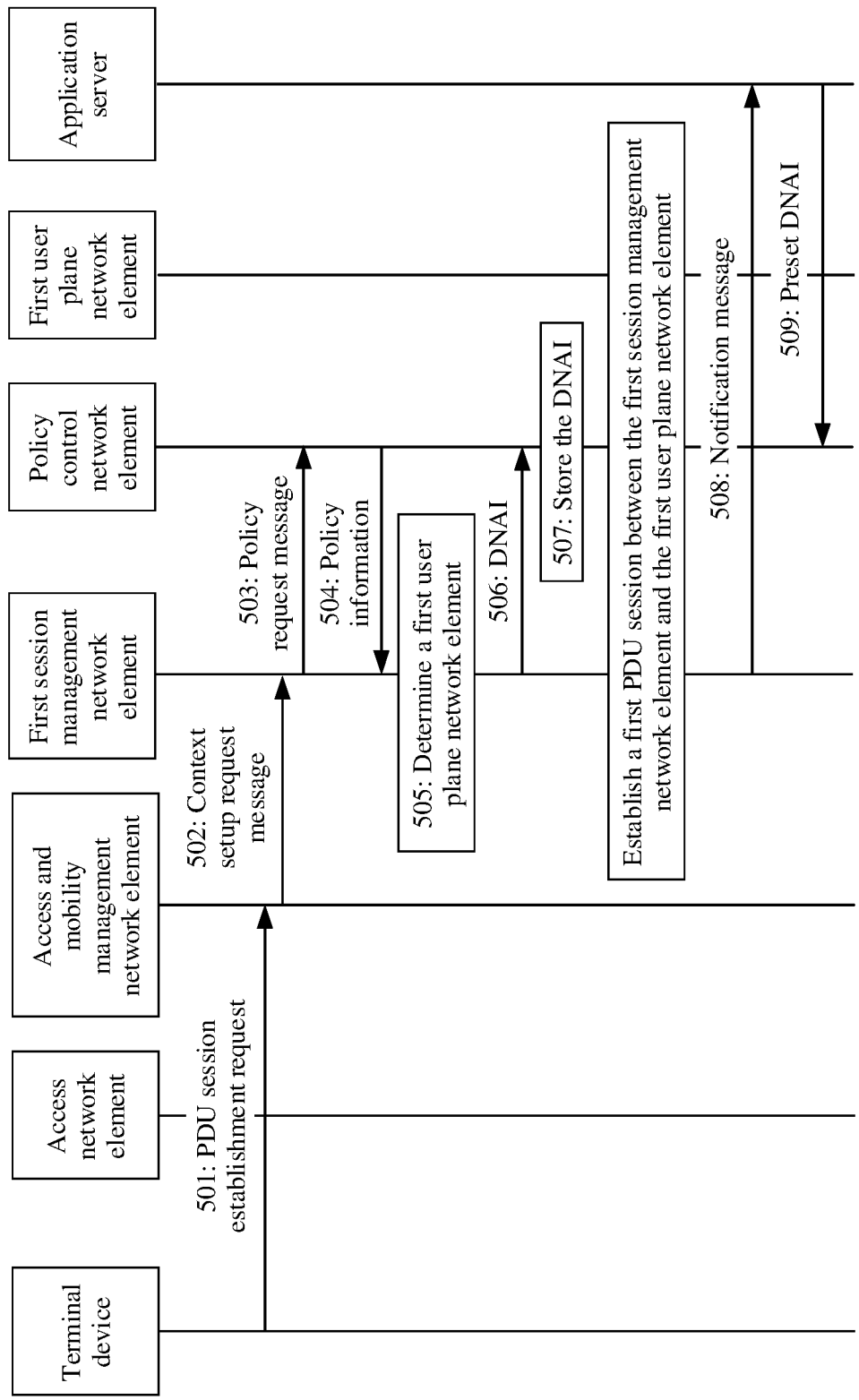
FIG. 5 is a schematic flowchart of PDU session establishment according to an embodiment of this application.

FIG. 5 is a schematic flowchart of PDU session establishment according to an embodiment of this application.

Step 501: A terminal device sends a PDU session establishment request to an access and mobility management network element by using an access network network element.

The PDU session establishment request is used to request to establish a first PDU session for the terminal device, and the PDU session establishment request may include information such as a PDU session identifier of the first PDU session and a DNN.

Step 502: The access and mobility management network element sends a request message to a first session management network element.

The request message is used to establish the first protocol data unit (PDU) session for the terminal device.

In a possible implementation, the request message may be a context setup request message. When the request message is a context setup request message, the request message is further used to request to set up a PDU session context for the first PDU session of the terminal device. The context setup request message includes information such as location information of the terminal device, the PDU session identifier of the first PDU session, and the DNN.

Step 503: The first session management network element sends a policy request message to a policy control network element.

The policy request message is used to request policy information, and the policy information may be policy information corresponding to the first PDU session.

Step 504: The policy control network element sends the policy information to the first session management network element.

Step 505: If the policy information does not include a DNAI, the first session management network element determines a first user plane network element for the terminal device.

For example, the first session management network element determines the first user plane network element based on information such as the location information of the terminal device or the DNN.

It should be noted that if the policy information includes the DNAI, the first session management network element determines the first user plane network element based on the DNAI. Details are not described herein again.

Step 506: The first session management network element determines a DNAI corresponding to the first user plane network element, and sends the DNAI corresponding to the first user plane network element to the policy control network element.

Step 507: The policy control network element stores the DNAI corresponding to the first user plane network element.

The policy control network element may mark the DNAI corresponding to the first user plane network element, for example, associate the DNAI with an application server, so that when re-establishing a PDU session established for the terminal device, the policy control network element determines a user plane network element based on the DNAI corresponding to the first user plane network element.

After step 507, the first PDU session is established between the first session management network element and the first user plane network element. Details are not described herein again.

When the first PDU session is released, the method may further include the following step.

Step 508: The first session management network element sends a notification message to the application server, and the notification message includes at least one of a release cause and the DNAI corresponding to the first user plane network element.

In a possible implementation, the method further includes step 509: The application server sends a preset DNAI to the policy control network element.

It should be noted that the preset DNAI may be the same as or different from the DNAI corresponding to the first user plane network element. The preset DNAI may be a DNAI specified by the application server. A specific specifying manner is not limited in this embodiment of this application. The application server may indicate the policy control network element to determine the user plane network element based on the preset DNAI when the PDU session is established for the terminal device.

Figure 6:
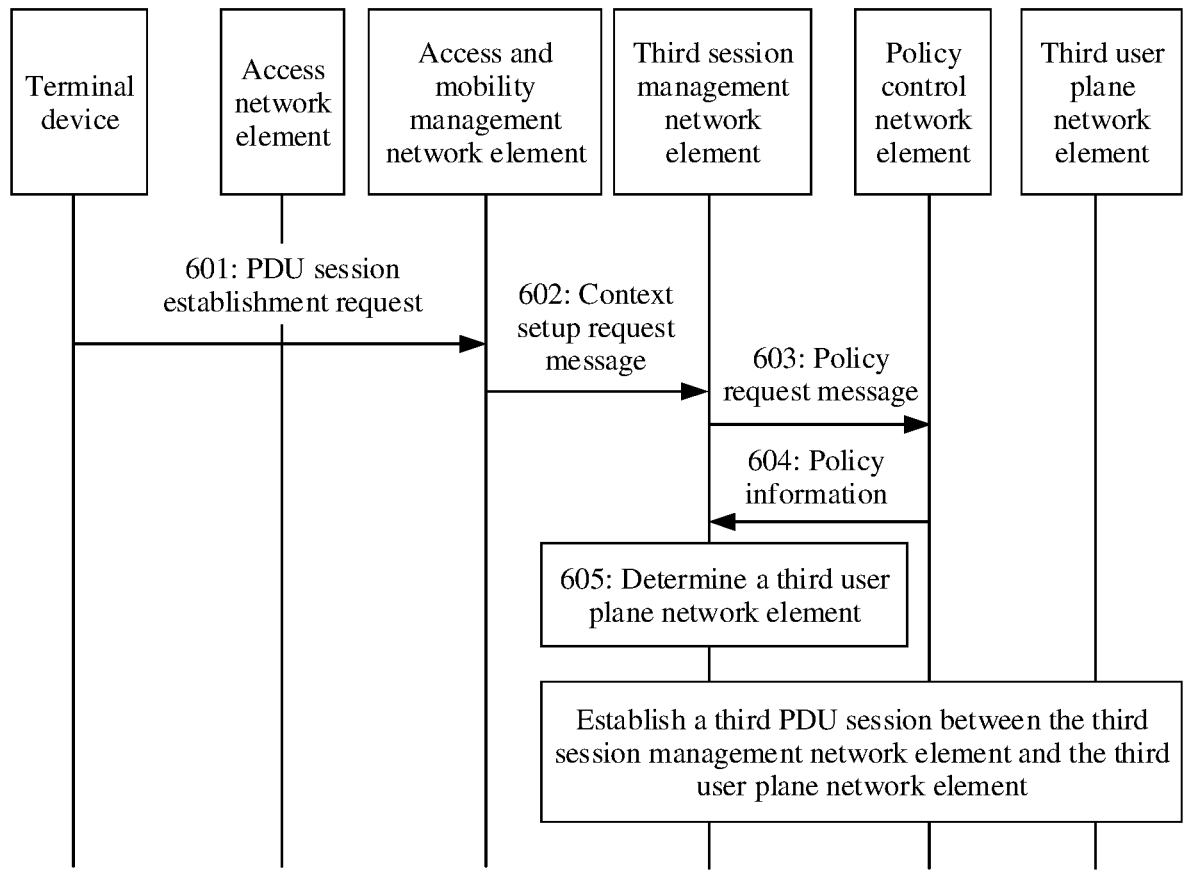
FIG. 6 is a schematic flowchart of PDU session establishment according to an embodiment of this application.

When the first PDU session is released, a network side may further re-establish a PDU session between the terminal device and the application server. The re-established PDU session is briefly referred to as a third PDU session below. With reference to the foregoing description, a procedure of establishing the third PDU session may be shown in FIG. 6.

Step 601: A terminal device sends a PDU session establishment request to an access and mobility management network element by using an access network element.

The PDU session establishment request is used to request to establish the third PDU session for the terminal device, and the PDU session establishment request may include information such as a PDU session identifier of the third PDU session and a DNN.

Step 602: The access and mobility management network element sends a context setup request message to a third session management network element.

The context setup request message is used to request to establish a PDU session context for the third PDU session of the terminal device, and the context setup request message includes information such as location information of the terminal device, the PDU session identifier of the third PDU session, and the DNN.

Step 603: The third session management network element sends a policy request message to a policy control network element.

The policy request message is used to request policy information, and the policy information may be policy information corresponding to the third PDU session. The policy information further includes a DNAI corresponding to a first user plane network element.

Step 604: The policy control network element sends the policy information to the third session management network element.

Step 605: The third session management network element determines a third user plane network element based on the DNAI corresponding to the first user plane network element.

For example, the third session management network element may determine a user plane network element that corresponds to the DNAI corresponding to the first user plane network element as the third user plane network element.

After step 605, the third PDU session is established between the third session management network element and the third user plane network element. Details are not described herein again.

Figure 7:
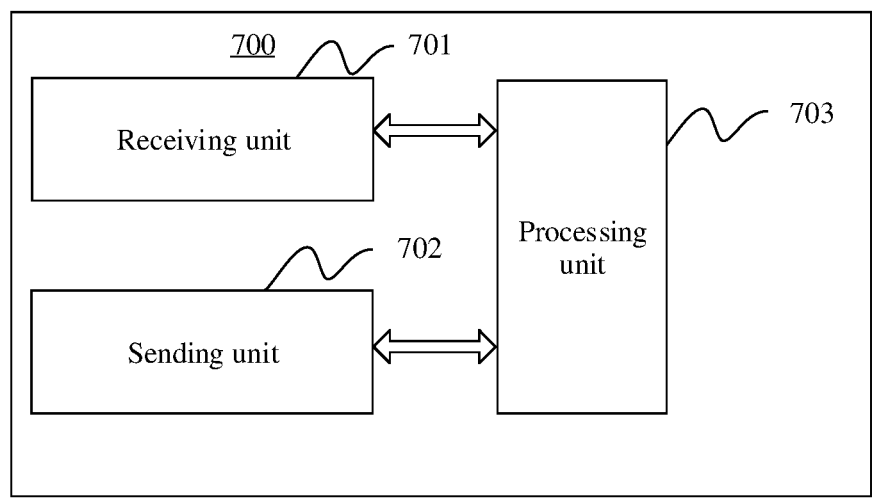
FIG. 7 is a schematic structural diagram of a communications apparatus according to an embodiment of this application.

FIG. 7 is a schematic structural diagram of a communications apparatus according to an embodiment of this application. The communications apparatus may be configured to perform actions of the policy control network element in the foregoing method embodiments. The communications apparatus 700 includes a receiving unit 701 and a sending unit 702.

The receiving unit 701 is configured to receive a policy request message from a first session management network element.

The sending unit 702 is configured to send the policy information to the first session management network element based on the policy request message. The policy information includes a data network access identifier (DNAI). The DNAI is configured to determine a first user plane network element. The first user plane network element is configured to establish a first protocol data unit (PDU) session for a terminal device.

In an optional implementation, the receiving unit 701 is further configured to receive the DNAI from a second session management network element, where the second session management network element establishes a second PDU session for the terminal device.

In an optional implementation, the apparatus further includes a processing unit 703.

The receiving unit 701 is further configured to obtain at least one DNAI.

The processing unit 703 is configured to select the DNAI from the at least one DNAI.

In an optional implementation, the receiving unit 701 is further configured to obtain at least one DNAI.

The sending unit 702 is further configured to send the at least one DNAI to a second session management network element that establishes a second PDU session for the terminal device.

The receiving unit 701 is further configured to receive the DNAI that the second session management network element selects from the at least one DNAI.

In an optional implementation, the apparatus further includes the processing unit 703. Before receiving the policy request message from the first session management network element, the receiving unit 701 is further configured to receive a first message from an application server, where the first message includes application relocation impossible indication information, and the application relocation impossible indication information is used to indicate a DNAI of a PDU session established for the terminal device to remain unchanged.

The processing unit 703 is configured to if a mode of a PDU session to which the first message belongs is determined, based on the first message, to be a session and service continuity SSC mode 2, send a first response to the application server by using the sending unit. The first response includes at least one of an SSC mode 2 identifier and rejection indication information, and the rejection indication information is used to reject a request indicated by using the application relocation impossible indication information sent from the application server.

Figure 8:
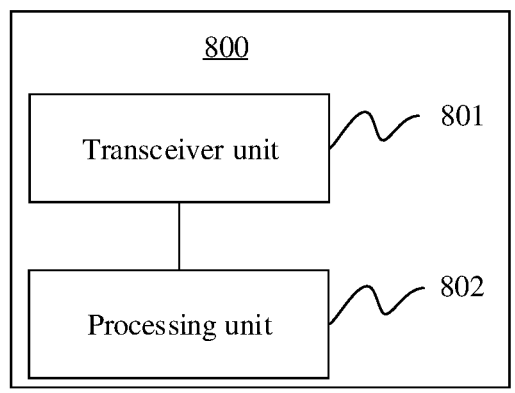
FIG. 8 is a schematic structural diagram of a communications apparatus according to an embodiment of this application.

FIG. 8 is a schematic structural diagram of a communications apparatus according to an embodiment of this application. The communications apparatus may be configured to perform actions of the first session management network element in the foregoing method embodiments. The communications apparatus 800 includes a transceiver unit 801 and a processing unit 802.

The transceiver unit 801 is configured to receive policy information from a policy control network element.

The processing unit 802 is configured to if the policy information includes a data network access identifier (DNAI), determine, based on the DNAI, a first user plane network element for establishing a first protocol data unit (PDU) session for a terminal device.

In an optional implementation, the DNAI is determined in a process of establishing a second PDU session for the terminal device.

In an optional implementation, the DNAI is selected by the policy control network element from at least one DNAI.

In an optional implementation, the DNAI is selected from at least one DNAI and sent to the policy control network element by a second session management network element, and the second session management network element establishes a second PDU session for the terminal device.

In an optional implementation, the transceiver unit 801 is further configured to after releasing the first PDU session, send a notification message to an application server, where the notification message includes at least one of a release cause and the DNAI.

Figure 9:
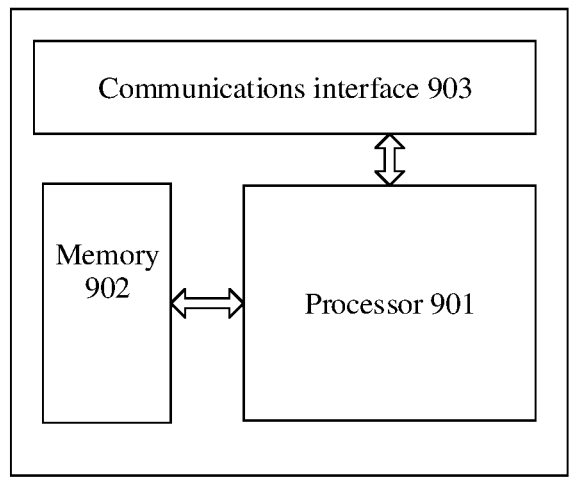
FIG. 9 is a schematic structural diagram of a communications apparatus according to an embodiment of this application.

FIG. 9 is a schematic structural diagram of a communications apparatus according to an embodiment of this application. The communications apparatus shown in FIG. 9 may be an implementation of a hardware circuit of the communications apparatus shown in FIG. 7. The communications apparatus may be applied to actions of the policy control network element in the foregoing method embodiments. For ease of description, FIG. 9 shows only main components of the communications apparatus. As shown in FIG. 9, the communications apparatus 900 includes a processor 901, a memory 902, and a communications interface 903. The processor 901 is mainly configured to process a communication protocol and communication data, control the entire wireless communications apparatus, execute a software program, and process data of the software program. For example, the processor 901 is configured to support the wireless communications apparatus in performing the actions described in the foregoing method embodiments. The memory 902 is mainly configured to store the software program and the data. The communications interface 903 is mainly configured to convert a signal and process a radio frequency signal.

The processor 901 is configured to perform the following steps by using the communications interface 903, including receiving a policy request message from a first session management network element, and sending the policy information to the first session management network element based on the policy request message, where the policy information includes a data network access identifier (DNAI), the DNAI is configured to determine a first user plane network element, and the first user plane network element is configured to establish a first protocol data unit (PDU) session for the terminal device.

In an optional implementation, the communications interface 903 is further configured to receive the DNAI from a second session management network element, where the second session management network element establishes a second PDU session for the terminal device.

In an optional implementation, the communications interface 903 is further configured to obtain at least one DNAI.

The processor 901 is configured to select the DNAI from the at least one DNAI.

In an optional implementation, the communications interface 903 is further configured to obtain at least one DNAI, send the at least one DNAI to a second session management network element that establishes a second PDU session for the terminal device, and receive the DNAI that the second session management network element selects from the at least one DNAI.

In an optional implementation, the communications interface 903 is further configured to receive a first message from an application server, where the first message includes application relocation impossible indication information, and the application relocation impossible indication information is used to indicate a DNAI of a PDU session established for the terminal device to remain unchanged.

The processor 901 is configured to if a mode of a PDU session to which the first message belongs is determined, based on the first message, to be a session and service continuity SSC mode 2, send a first response to the application server by using the sending unit. The first response includes at least one of an SSC mode 2 identifier and rejection indication information, and the rejection indication information is used to reject a request indicated by using the application relocation impossible indication information sent from the application server.

Figure 10:
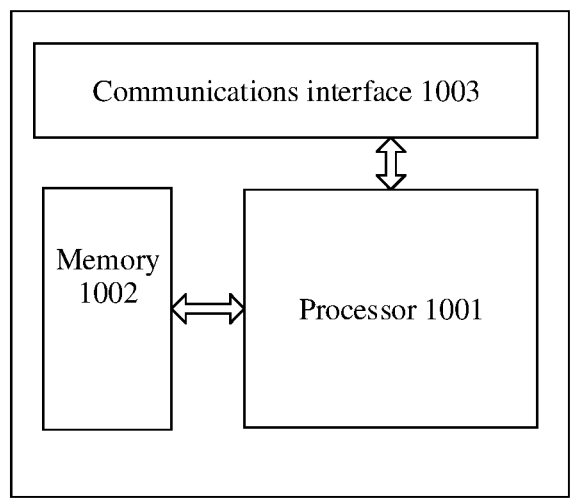
FIG. 10 is a schematic structural diagram of a communications apparatus according to an embodiment of this application.

FIG. 10 is a schematic structural diagram of a communications apparatus according to an embodiment of this application. The communications apparatus shown in FIG. 10 may be an implementation of a hardware circuit of the communications apparatus shown in FIG. 8. The communications apparatus may be configured to perform actions of the first session management network element in the foregoing method embodiments. For ease of description, FIG. 10 shows only main components of the communications apparatus. As shown in FIG. 10, the communications apparatus 1000 includes a processor 1001, a memory 1002, and a communications interface 1003. The processor 1001 is mainly configured to process a communication protocol and communication data, control the entire wireless communications apparatus, execute a software program, and process data of the software program. For example, the processor 1001 is configured to support the wireless communications apparatus in performing the actions described in the foregoing method embodiments. The memory 1002 is mainly configured to store the software program and the data. The communications interface 1003 is mainly configured to convert a signal and process a radio frequency signal.

The communications interface 1003 is configured to receive policy information from a policy control network element.

The processor 1001 is configured to if the policy information includes a data network access identifier (DNAI), determine, based on the DNAI, a first user plane network element for establishing a first protocol data unit (PDU) session for a terminal device.

In an optional implementation, the DNAI is determined in a process of establishing a second PDU session for the terminal device.

In an optional implementation, the DNAI is selected by the policy control network element from at least one DNAI.

In an optional implementation, the DNAI is selected from at least one DNAI and sent to the policy control network element by a second session management network element, and the second session management network element establishes a second PDU session for the terminal device.

In an optional implementation, the communications interface 1003 is further configured to after releasing the first PDU session, send a notification message to an application server, where the notification message includes at least one of a release cause and the DNAI.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

It is clear that a person skilled in the art can make various modifications and variations to this application without departing from the scope of this application. This application is intended to cover these modifications and variations of this application provided that they fall within the scope defined by the following claims and their equivalent technologies.

What is claimed is:

1. A communications method, comprising:
receiving, by a policy control network element, a first message from a second application server, wherein the first message comprises application relocation impossible indication information, and wherein the application relocation impossible indication information indicates a data network access identifier (DNAI) of a protocol data unit (PDU) session established for a terminal device to remain unchanged;
determining, by the policy control network element based on the first message, that a mode of the PDU session to which the first message belongs is a session and service continuity (SSC) mode 2; and
sending, by the policy control network element, a first response to the second application server, wherein the first response comprises rejection indication information, and wherein the rejection indication information indicates rejection of a request indicated by the application relocation impossible indication information sent from the second application server;
receiving a policy request message by the policy control network element, from a first session management network element, after receiving the first message, after determining that the mode of the PDU session to which the first message belongs is a SSC mode 2, and after sending the first response;
sending, by the policy control network element, to the first session management network element, according to the policy request message, policy information, wherein the policy information comprises a DNAI associated with a first application server; and
establishing, by the first session management network element, according to the DNAI, a first user plane network element for a first PDU session for the terminal device, wherein the first application server is configured to provide a data service for the terminal device using the first PDU session.

2. The method according to claim 1, further comprising:
receiving, by the policy control network element, the DNAI from a second session management network element, wherein the second session management network element establishes a second PDU session for the terminal device;
wherein the sending the policy information to the first session management network element comprises:

sending, by the policy control network element, to the first session management network element, in response to the second PDU session for the terminal device being released and according to the policy request message, the policy information.

3. The method according to claim 1, wherein the method further comprises:
obtaining, by the policy control network element, at least one candidate DNAI; and
selecting, by the policy control network element, the DNAI from the at least one candidate DNAI.

4. The method according to claim 1, wherein the method further comprises:
obtaining, by the policy control network element, at least one candidate DNAI;
sending, by the policy control network element, the at least one candidate DNAI to a second session management network element that establishes a second PDU session for the terminal device; and
receiving, by the policy control network element, the DNAI that the second session management network element selects from the at least one candidate DNAI.

5. The method according to claim 1, further comprising:
determining, by the first session management network element, according to the DNAI, the first user plane network element for establishing the first PDU session for the terminal device.

6. The method according to claim 1, further comprising:
sending, by the first session management network element, after the first session management network element releases the first PDU session, a notification message to the first application server, wherein the notification message comprises at least one of a release cause or the DNAI.

7. The method according to claim 1, further comprising:
receiving, by the first session management network element from an access and mobility management network element, a request message requesting establishment of the first PDU session for the terminal device.

8. A system, comprising:
a policy control network element, configured to receive a first message from a second application server, wherein the first message comprises application relocation impossible indication information, and wherein the application relocation impossible indication information indicates a data network access identifier (DNAI) of a protocol data unit (PDU) session established for a terminal device to remain unchanged, wherein the policy control network element is further configured to determine, according to the first message, that a mode of the PDU session to which the first message belongs is a session and service continuity (SSC) mode 2, and wherein the policy control network element is further configured to send a first response to the second application server, wherein the first response comprises rejection indication information, wherein the rejection indication information indicates rejection of a request indicated by the application relocation impossible indication information sent from the second application server, wherein the policy control network element is further configured to receive a policy request message from a first session management network element, and further configured to send policy information to the first session management network element according to the policy request message, wherein the policy information comprises a DNAI associated with a first application server; and the first session management network element, configured to establish, according to the DNAI, a first user plane network element for a first PDU session for the terminal device, wherein the first application server is configured to provide a data service for the terminal device using the first PDU session.

9. The system according to claim 8, wherein the policy control network element is further configured to receive the DNAI from a second session management network element, wherein the second session management network element establishes a second PDU session for the terminal device;
wherein the policy control network element being configured to send the policy information to the first session management network element, comprises the policy control network element being configured to send the policy information to the first session management network element based on the policy request message when the second PDU session for the terminal device is released.

10. The system according to claim 8, wherein the policy control network element is further configured to obtain at least one candidate DNAI, and to select the DNAI from the at least one candidate DNAI.

11. The system according to claim 8, wherein the policy control network element is further configured to obtain at least one candidate DNAI, to send the at least one candidate DNAI to a second session management network element that establishes a second PDU session for the terminal device, and to receive the DNAI that the second session management network element selects from the at least one candidate DNAI.

12. The system according to claim 8, wherein the first session management network element is further configured to determine, according to the DNAI, the first user plane network element for establishing the first PDU session for the terminal device.

13. The system according to claim 8, wherein the first session management network element is further configured to send a notification message to the first application server after the first session management network element releases the first PDU session, wherein the notification message comprises at least one of a release cause or the DNAI.

14. The system according to claim 8, wherein the first session management network element is further configured to receive, from an access and mobility management network element, a request message requesting establishment of the first PDU session for the terminal device.

15. An apparatus, comprising:
at least one processor; and
a non-transitory memory having a program stored thereon for execution by the processor, the program including instructions to:
receive a first message from a second application server, wherein the first message comprises application relocation impossible indication information, and wherein the application relocation impossible indication information indicates a data network access identifier (DNAI) of a protocol data unit (PDU) session established for a terminal device to remain unchanged;
determine, according to the first message, that a mode of the PDU session to which the first message belongs is a session and service continuity (SSC) mode 2; and
send a first response to the second application server, wherein the first response comprises rejection indication information, and wherein the rejection indication information indicates rejection of a request indicated by the application relocation impossible indication information sent from the second application server;

receive a policy request message from a first session management network element;

send policy information to the first session management network element according to the policy request message, wherein the policy information comprises a DNAI associated with a first application server, wherein the DNAI is used for determining a first user plane network element for establishing a first PDU session for the terminal device, and wherein the first application server is configured to provide a data service for the terminal device using the first PDU session.

16. The apparatus according to claim 15, wherein the program further includes instructions to receive the DNAI from a second session management network element, wherein the second session management network element establishes a second PDU session for the terminal device;

wherein the instructions to send the policy information to the first session management network element include instructions to:

send the policy information to the first session management network element according to the policy request message in response to the second PDU session for the terminal device being released.

17. The apparatus according to claim 15, wherein the program further includes instructions to obtain at least one candidate DNAI, and select the DNAI from the at least one candidate DNAI.

* * * * *